(No Model.) 2 Sheets—Sheet 1.
E. GESSNER.
FEEDING DEVICE FOR CARDING MACHINES.
No. 257,313. Patented May 2, 1882.
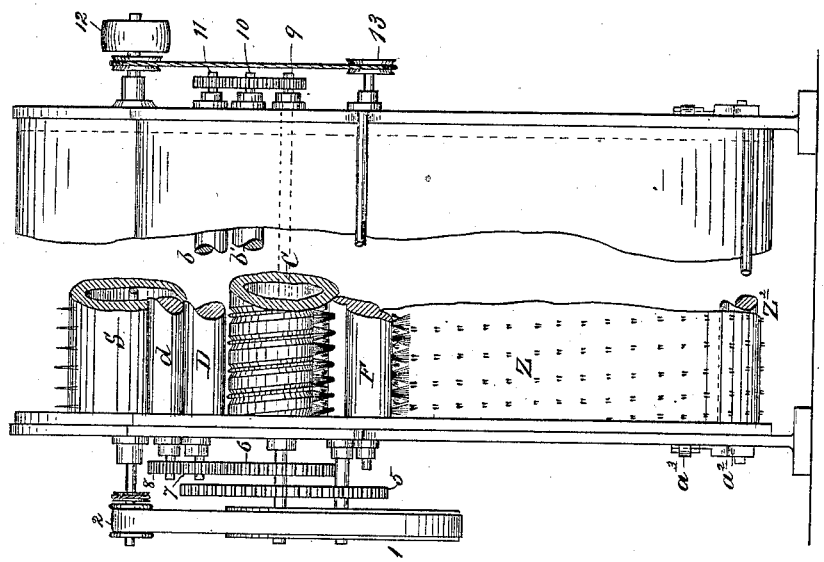
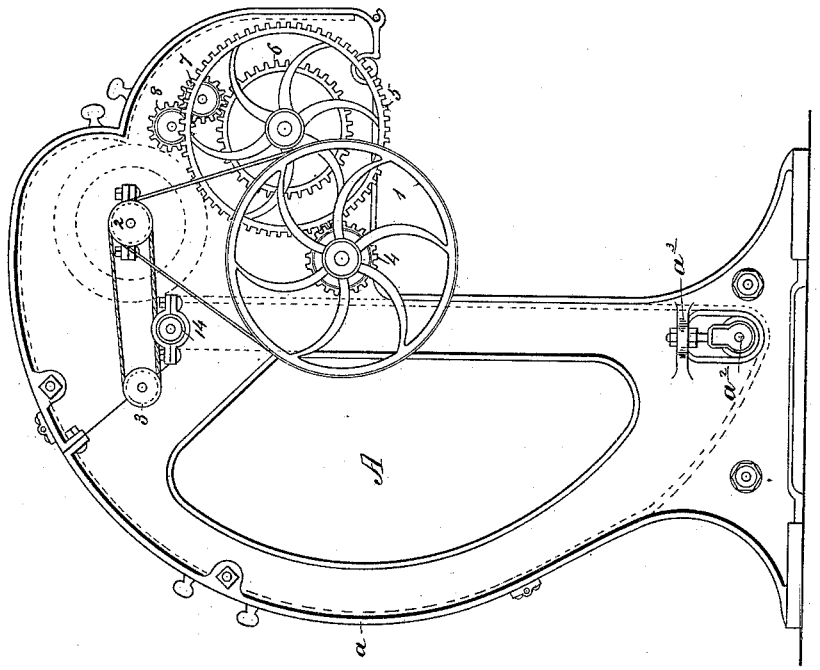
WITNESSES:
W. W. Hollingsworth
Edw. W. Byer
INVENTOR:
Ernst Gessner
BY
ATTORNEYS.

(No Model.)
E. GESSNER.
FEEDING DEVICE FOR CARDING MACHINES.
No. 257,313. Patented May 2, 1882.
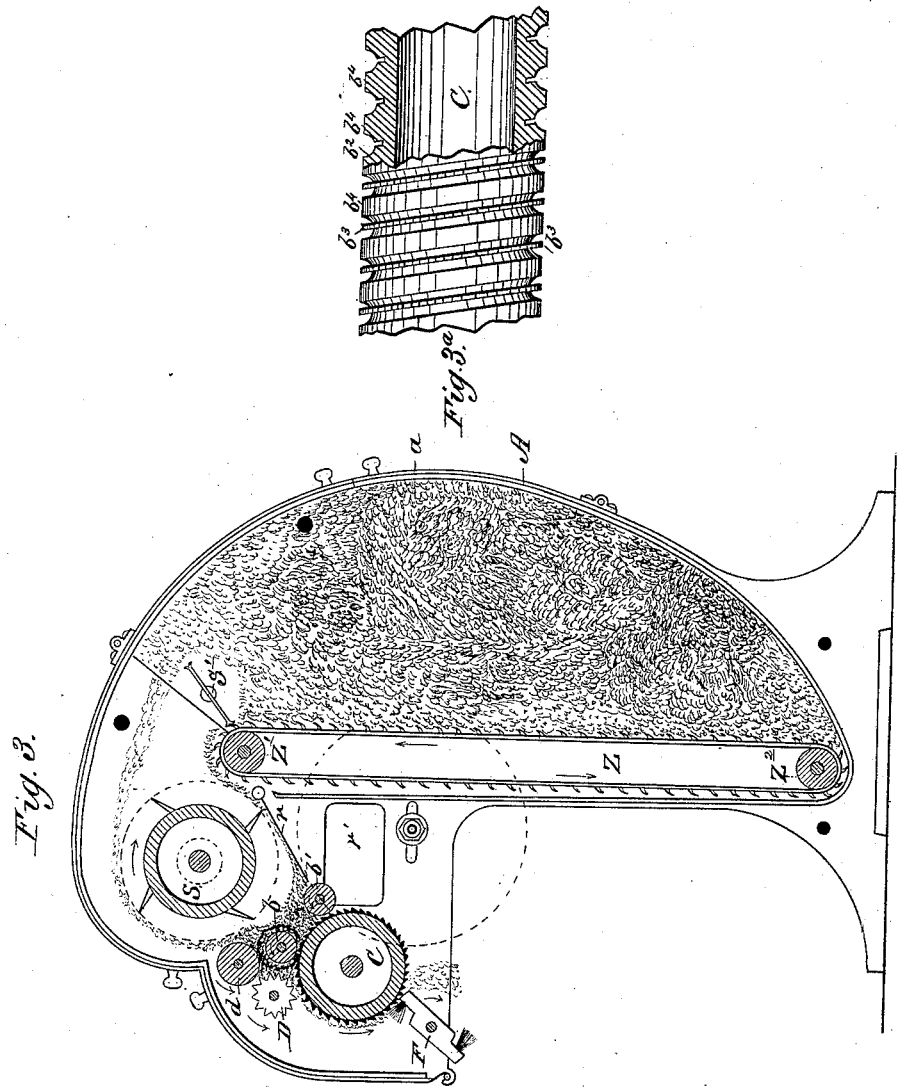

UNITED STATES PATENT OFFICE.

ERNST GESSNER, OF AUE, SAXONY, GERMANY.

FEEDING DEVICE FOR CARDING-MACHINES.

SPECIFICATION forming part of Letters Patent No. 257,313, dated May 2, 1882.

Application filed September 3, 1881. (No model.) Patented in England June 17, 1881, in Belgium August 30, 1881, in Germany September 6, 1881, and in France September 16, 1881.

*To all whom it may concern:*

Be it known that I, ERNST GESSNER, of Aue, Saxony, Germany, have invented a new and useful Improvement in Feeding Devices for Carding-Machines; and I do hereby declare that the following is a full, clear, and exact description of the same, reference being had to the accompanying drawings, forming part of this specification.

The object of my invention is to provide an improved feeder for delivering an equal and regular supply of wool or other material to a carding-machine.

My invention is of the same general type as that patented to J. S. Bolette, August 23, 1864, in which a wool box is provided with a vertical spiked lifting-apron, and has a beater at or near the top to drive back the excess of wool, and also a revolving, equalizing, and distributing toothed cylinder, which transfers the wool from the top of the lift-apron to the final feed-rolls, and co-operates with the beater in removing that excess of wool which is over and above the proper amount which the final feed-rolls should take.

My improvements consist in such additional elements and improved arrangement of parts as will be fully described hereinafter and pointed out in the claims.

Figure 1 is a side elevation of the machine complete. Fig. 2 represents views of the end portion of the machine, the left-hand portion having the external casing removed and the right-hand portion having it in place. Fig. 3 is a vertical cross-section; and Fig. 3ª is a detail showing partly in section and partly in side elevation the construction of cylinder C.

A represents a wool-box, which is made with a semicircular side, having a hinged door, $a$, for the insertion of wool. Vertically within this wool-box, and extending from the bottom to nearly the top of the same, is a lifting-apron, Z, passing around a roller, Z', at the top, and another, $Z^2$, at the bottom. This apron is provided with spikes or teeth, which, as the apron revolves, carry up the wool to a revolving beater, S', by which the larger bunches of wool are driven back, while the remaining portion are delivered to the transferring and distributing cylinder or beater S.

The apron Z is driven by the upper roller, Z', and, as it is liable to become loose and slip, its tension is regulated by a downward adjustment of the lower roller, $Z^2$; and for this purpose the journals of the roller $Z^2$ are extended through slots in the sides of the frame, and are arranged in bearings $a^2$, Fig. 1, that are provided with screw-stems, that pass through a perforated lug, $a^3$, on each side of the frame, and upon each side of which lugs screw-nuts are adjusted, which mesh with the thread of the screw-stems to hold the bearings and the journals of the rolls to the adjustment necessary to give proper tension to the apron.

Just between the elevating-apron Z on the one hand and the final feed-roller and its companion rollers on the other is arranged an open grating, $r$, (see Fig. 3,) and a subjacent burr-box, $r'$. This grating is located immediately beneath the revolving transfer-cylinder and beater S, and forms the channel or chute over which the wool is dashed in its transfer by said cylinder from the lift-apron to the said final feed-rolls. The function and value of this grating in this relation is that the wool is spread over the same in a thin fleece and dashed violently against the grating by the rapid action of the revolving cylinder or beater, which dislodges every particle of foreign matter from the wool and drives it down, by reason of its momentum, into the burr-box below.

I am aware that the bottom of the wool-box has been heretofore provided with a grating or an open bottom for the elimination of foreign particles; but, as is obvious, only a relatively small part of the wool can be brought in sufficient proximity to the bars to permit the particles to drop out, and there is, moreover, not sufficient mechanical action to dislodge them. In my case the wool is spread thin over the grating, so that all the particles in the wool can drop out, and the violent action of the cylinder or beater S at its high speed serves to supply the necessary mechanical action for dislodging the said impurities. In this connection I would also refer to the English Patent No. 1,671 of 1856, and state that I do not claim broadly a transfer-cylinder revolving over a grate, but only these elements in combination with the vertical lift-apron and the final feed-rolls of a card-feeder, whereby the advantages hereinbefore enumerated are obtained in one and the same operation with the feeding of the wool. With respect to the revolving beater S, it need not be a spiked cylinder, as shown, but it may be a shaft with arms or longitudinal wings, a brush, or any similar rotary device. This transfer-beater may be made adjustable to or from the feeding devices to feed more or less wool.

Just at the lower end of the grating $r$ is arranged the final feed-roller C and its companion rollers $b$, $b'$, $d$, and D. The roller $b$ is a lap-roller, and is partially surrounded by the rollers C D $d$ and cylinder S, and as the wool passes from grate $r$ it is delivered by roller $b'$ to the lap-roller $b$, around which it is wound in a perfectly even and uniform lap. The roller D, which is preferably fluted or ribbed, pinches or holds the lap of wool on lap-roll $b$, while the teeth of roller C pull it off in even quantities, which are subsequently deposited by brush F upon the feed-belt of the carding-machine or other suitable receiving device. This roller D may be made adjustable to or from the feed-cylinder C. The roller $d$, resting above the lap-roll, pinches and holds the lap while it is being evened by the cylinder S. Just here it will be seen the revolving beater or cylinder S has a double function, for it not only feeds uniformly the stock down the grating $r$, but removes any surplus from the lap-roll $b$ whenever the diameter of the same becomes such, by reason of too much wool, as to cause it to come within the range of the transfer-cylinder and beater S.

In constructing the final feeding-roll C its teeth are not allowed to project above its plain periphery, but are made flush with the alternating smooth faces, and for this purpose the cylinder C has round grooves $b^2$ cut around its periphery in rings or spirals, with a smaller groove at the middle or in the deepest portion of the said groove $b^2$. Then the teeth are formed in the nature of a strip, $b^3$, that is laid and fastened in the smaller bottom groove, so that its teeth are about on a level with the intervening plain surfaces $b^4$ of the cylinder. This structure of cylinder, having its teeth on a level with its plain surfaces, has a special coactive relation to the lap-roll $b$, in that it insures a perfectly uniform taking off of wool from the lap by the cylinder C, for as the plain surfaces $b^4$ of the cylinder afford bearing-points to the lap of the roll $b$ the latter can be located to bear uniformly throughout its whole length on the feed-cylinder C without any danger of the latter pulling too much wool off, the wool only coming off in long shreds on each side of the teeth in the grooves $b^2$ with a long staple, and in a position most favorable for subsequent carding without breaking the staple. I do not claim, however, to be the first to make a cylinder in which the teeth are on the same level with the alternating plain surfaces, as I am aware that this has been done in burring-machines in which a cylinder has been provided with grooves cut in its periphery and a strip of teeth located in one set of grooves and a plain strip placed in the alternate grooves, so that its plain surface is on the same level with the tops of the teeth. My particular construction of said cylinder, with a rounded groove having a smaller groove in its bottom and seating therein a strip of teeth, is a feature of merit as regards a cheap construction, for in the first place there are but two parts to the cylinder—the body portion and the saw-teeth; and, again, the plain intervening surfaces $b^4$ being integral with the cylinder, they can be made with broader faces, and, being rigid, afford a more substantial protection to the teeth against injury.

For driving the rollers and various parts of the machine, a pulley, 12, (see Figs. 1 and 2,) is located on one end of the beater-shaft and imparts motion to said shaft. To the other end of this shaft is keyed a pulley, 2, which is connected by a belt to a larger pulley, 1, on the same shaft with a gear-wheel, 4. This latter engages with a gear-wheel, 5, on the shaft of feed-cylinder C and drives it, and from this cylinder-shaft motion is communicated to the rolls $b$, $b'$, $d$, and D, as follows: At one end of this shaft a gear-wheel, 6, meshes with a pinion, 7, on roller, D, and pinion 7 meshes with and turns pinion 8 of roller $d$. At the other end of the machine the feed-cylinder shaft bears a pinion, 9, that gears with 10 on roller $b'$, and 10 in turn gears with 11 on roller $b$. For driving the beater S', a pulley, 3, is keyed to its shaft and belted to pulley 2, (see Fig. 1,) while for driving the brush F a pulley, 13, in Fig. 2, is belted to a pulley on the drive-shaft carrying pulley 12. The lift-apron has its upper roll-shaft extended and provided with pulley 14, which is driven by an independent belt-connection.

Having thus described my invention, what I claim as new is—

1. A card-feeder consisting of the combination of the following elements: a wool-box, the vertical lift-apron Z, the final feed-rolls, the grate $r$, interposed between the upper portion of the lift-apron and the final feed-rolls, the revolving beater and transferring-cylinder S, located above the grate and arranged, as described, to transfer the wool, clean it in transit, and return the excess over the top of the lift-apron, and driving mechanism for operating the parts, substantially as described.

2. In a wool feeding device, the combination of a revolving, transferring, and equalizing beater, S, a final feed-roll, C, and an intermediate lap-roll, $b$, with means for operating the same, the said elements being arranged in the relation described, whereby the feed-roll is made to take wool uniformly from the lap-roll and the beater is made to equalize or remove the excess of wool from the lap-roll, substantially as described.

3. In a wool-feeding device, the combination of a revolving transferring and equalizing beater, S, a final feed-roll, C, the intermediate lap-roll, b, and the roll D, arranged to hold back the wool on the lap-roll against the pull of the feed-roll C, and means for operating the same, substantially as shown and described.

4. The combination, with the lap-roll b and the roll D, of the feed-roll C, having upon its periphery alternating teeth and plain surfaces of equal height, with means for operating the same, whereby the lap-roll may be arranged close to the feed-roll and the wool pulled out in long shreds, as and for the purpose described.

5. The roller C, having a groove cut around its periphery and a narrower groove cut in the bottom of this groove, in combination with the strip of saw-teeth set in the narrow groove in the bottom of the main groove, with its teeth flush with the alternating plain surfaces of the cylinder, substantially as and for the purpose described.

6. The combination of the box A, apron Z, first beater S', transfer and equalizing beater S, grate r, rollers C D d b, and brush F, with means for operating them, substantially as shown and described.

The above specification of my invention signed by me this 18th day of May, 1881.

ERNST GESSNER.

Witnesses:
N. H. QUINN,
R. KNOCH.